(12) United States Patent
Chang et al.

(10) Patent No.: US 11,824,575 B2
(45) Date of Patent: Nov. 21, 2023

(54) PROTECTIVE COVER FOR TABLET COMPUTER AND PORTABLE ELECTRONIC DEVICE

(71) Applicant: Darfon Electronics Corp., Taoyuan (TW)

(72) Inventors: Yu Chih Chang, Taoyuan (TW); Chin Lung Chan, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 64 days.

(21) Appl. No.: 17/467,285

(22) Filed: Sep. 6, 2021

(65) Prior Publication Data

US 2022/0407555 A1 Dec. 22, 2022

(30) Foreign Application Priority Data

Jun. 22, 2021 (TW) .................................. 110122690

(51) Int. Cl.
*H04B 1/3888* (2015.01)
*G06F 1/16* (2006.01)

(52) U.S. Cl.
CPC ......... *H04B 1/3888* (2013.01); *G06F 1/1656* (2013.01)

(58) Field of Classification Search
CPC ............................. H04B 1/3888; G06F 1/1656
See application file for complete search history.

(56) References Cited

U.S. PATENT DOCUMENTS

| | | |
|---|---|---|
| 4,730,160 A | 3/1988 | Cusack et al. |
| 5,295,089 A | 3/1994 | Ambasz |
| 5,859,762 A | 1/1999 | Clark et al. |

(Continued)

FOREIGN PATENT DOCUMENTS

| | | |
|---|---|---|
| CN | 203204495 U | 9/2013 |
| CN | 103249268 B | 6/2016 |

(Continued)

OTHER PUBLICATIONS

TW Office Action dated Feb. 24, 2023 in Taiwan application No. 111124845.

*Primary Examiner* — Yuwen Pan
*Assistant Examiner* — Fatuma G Sherif
(74) *Attorney, Agent, or Firm* — McClure, Qualey & Rodack, LLP (57) ABSTRACT

A protective cover for a tablet computer includes a main body, a peripheral device and a protective cover signal transmission member. The main body includes a first supporting member and a second supporting member connected to each other and can be opened and closed relative to each other. The peripheral device is disposed on the first supporting member. The protective cover signal transmission member is disposed on the second supporting member and electrically connected with the peripheral device. The second supporting member supports the tablet computer. The tablet computer includes a computer signal transmission member. The protective cover signal transmission member is used to dock with the computer signal transmission member to perform signal transmission. One of the computer signal transmission member and the protective cover signal transmission member is an electrical block, and the other is an electrical guide rail. A portable electronic device is also provided.

10 Claims, 8 Drawing Sheets

(56) References Cited

U.S. PATENT DOCUMENTS

| | | |
|---|---|---|
| 6,778,196 B2 | 8/2004 | Nakamura |
| 6,922,333 B2 | 7/2005 | Weng et al. |
| 7,280,348 B2 | 10/2007 | Ghosh |
| 7,586,743 B2 | 9/2009 | Lin |
| 8,150,485 B2 | 4/2012 | Lee |
| 8,358,513 B2 | 1/2013 | Kim |
| 8,811,034 B2 | 8/2014 | Lee |
| 10,853,018 B2 | 12/2020 | Kim et al. |
| 2005/0168925 A1 | 8/2005 | Fang et al. |
| 2010/0001163 A1 | 1/2010 | Takizawa |
| 2011/0096513 A1* | 4/2011 | Kim .................. H04M 1/72409 361/728 |
| 2016/0011630 A1* | 1/2016 | Chen .................... G06F 1/1622 361/679.55 |

FOREIGN PATENT DOCUMENTS

| | | |
|---|---|---|
| JP | S61-288258 A | 12/1986 |
| KR | 10-1454238 B1 | 11/2014 |
| KR | 10-1474418 B1 | 12/2014 |
| TW | 201023458 A | 6/2010 |
| TW | M406962 U | 7/2011 |
| TW | M426316 U | 4/2012 |
| TW | I396319 B | 5/2013 |

* cited by examiner

PROTECTIVE COVER FOR TABLET COMPUTER AND PORTABLE ELECTRONIC DEVICE

FIELD OF THE INVENTION

The present invention relates to a protective cover and a portable electronic device, and more particularly to a protective cover and a portable electronic device applied to a tablet computer.

BACKGROUND OF THE INVENTION

At present, the tablet computers have become a very common portable electronic device. In order to avoid damage caused by accidental fall of the tablet computer or collision or friction with other objects when carrying or using the tablet computer, many people will add a protective cover to the tablet computer so as to achieve the effect of protection.

Nowadays, the design of protective covers has a diversified trend. In addition to the protective function, the protective cover for the tablet computer can also provide the function of supporting the tablet computer and command input. For example, the protective cover can be provided with a keyboard for inputting control commands to the tablet computer, which can solve the problem that the touch screen of the tablet computer is too small, which is unfavorable for inputting control commands. The protective sleeve and the tablet computer need to be provided with electrical connectors respectively, so that the protective sleeve and the tablet computer form an electrical connection through the docking of the electrical connectors, so as to achieve the keyboard input requirement.

However, the electrical connectors respectively provided on the protective cover and the tablet computer are all set at a fixed position. The tablet computer cannot maintain the physical connection with the electrical connector of the protective cover when the tablet computer needs to be rotated for viewing. At present, an electrical connector can be added to the back or the horizontal/vertical bottom of the tablet computer to solve the problem of electrical connection between the tablet computer and the protective cover, however, it is easy to increase the cost due to the addition of the electrical connector, and there is a problem of poor operation smoothness due to repeated plugging and unplugging of the electrical connector needed during the operation.

SUMMARY OF THE INVENTION

The present invention provides a protective cover for a tablet computer and a portable electronic device. The protective cover supporting the tablet computer can be always electrically connected to the tablet computer no matter how the tablet computer is moved or rotated, thereby facilitating the user to operate the peripheral device to input instructions. Thus, not only the cost is reduced, but also the advantage of high operation smoothness is provided.

The protective cover for a tablet computer provided by the present invention includes a main body, a peripheral device and a protective cover signal transmission member. The tablet computer includes a computer signal transmission member. The main body includes a first supporting member and a second supporting member connected to each other. The first supporting member and the second supporting member can be opened and closed relative to each other. The peripheral device is disposed on the first supporting member. The protective cover signal transmission member is disposed on the second supporting member and electrically connected with the peripheral device. The second supporting member is used to support the tablet computer. The protective cover signal transmission member is used to dock with the computer signal transmission member, so that the protective cover and the tablet computer perform signal transmission can perform signal transmission. One of the computer signal transmission member and the protective cover signal transmission member is an electrical block, and the other one of the computer signal transmission member and the protective cover signal transmission member is an electrical guide rail.

The portable electronic device provided by the present invention includes a tablet computer and a protective cover. The tablet computer includes a computer signal transmission member. The protective cover includes a main body, a peripheral device and a protective cover signal transmission member. The main body includes a first supporting member and a second supporting member connected to each other. The first supporting member and the second supporting member can be opened and closed relative to each other. The peripheral device is disposed on the first supporting member. The second supporting member is used to support the tablet computer. The protective cover signal transmission member is disposed on the second supporting member and electrically connected with the peripheral device. The protective cover signal transmission member is used to dock with the computer signal transmission member, so that the protective cover signal transmission member and the tablet computer can perform signal transmission. One of the computer signal transmission member and the protective cover signal transmission member is an electrical block, and the other one of the computer signal transmission member and the protective cover signal transmission member is an electrical guide rail. In a variant embodiment, the present invention provides a protective cover for a tablet computer. The protective cover is adapted to removably couple at least three electrical blocks arranged in a straight line. The protective cover includes a main body, two outer electrical guide rails and at least one inner electrical guide rail. The main body includes a first supporting member and a second supporting member connected to each other. The first supporting member and the second supporting member are able to be opened and closed relative to each other. The two outer electrical guide rails and at least one inner electrical guide rail attachably correspond to the electrical blocks, respectively. The outer electrical guide rails and the inner electrical guide rail are at least partially arranged on the second supporting member in parallel. Each of the outer electrical guide rails and the inner electrical guide rail has a longitudinal section and a transverse section. When the electrical blocks correspondingly couple the longitudinal sections of the outer electrical guide rails and the inner electrical guide rail, the electrical blocks is able to move along the outer electrical guide rails and the inner electrical guide rail to be aligned with the transverse section of the inner electrical guide rail in a line, or when the electrical blocks correspondingly couple the traverse sections of the outer electrical guide rails and the inner electrical guide rail, the electrical blocks is able to move along the outer electrical guide rails and the inner electrical guide rail to be aligned with the longitudinal section of the inner electrical guide rail in a line. In a variant embodiment, the longitudinal section and the traverse section of each of the outer electrical guide rails and the inner electrical guide rail are perpendicular to each other. In a variant embodiment, the protective cover further includes a peripheral device disposed on the first supporting member. In a variant embodiment, the longitudinal section of one of the two outer electrical guide rails extends upward beyond the traverse section. In a variant embodiment, the longitudinal section of the inner electrical guide rail extends upward beyond the traverse section. In a variant embodiment, the traverse sections of the two outer electrical guide rails extend toward opposite directions. In a variant embodiment, when the electrical blocks couple the outer electrical guide rails and the inner electrical guide rail, the electrical blocks are arranged perpendicular to the longitudinal section or the traverse section.

In an embodiment of the present invention, the electrical guide rail includes a longitudinal section, a transverse section and a turning section, and the turning section is connected between the longitudinal section and the transverse section.

In an embodiment of the present invention, the computer signal transmission member is the electrical block, and the protective cover signal transmission member is the electrical guide rail.

In an embodiment of the present invention, the second supporting member is provided with a groove, the groove has a top opening and a bottom, and the electrical guide rail is disposed on the bottom.

In an embodiment of the present invention, the computer signal transmission member is the electrical guide rail, and the protective cover signal transmission member is the electrical block.

In an embodiment of the present invention, the tablet computer is provided with a groove, the groove has a top opening and a bottom, and the electrical guide rail is disposed on the bottom.

In an embodiment of the present invention, the electrical block is a pogo pin.

In an embodiment of the present invention, the electrical guide rail includes a first end and a second end opposite to each other. Compared to a long edge of the tablet computer when the electrical block is located at the first end, the long edge of the tablet computer rotates 90 degrees when the electrical block is located at the second end.

In an embodiment of the present invention, the protective cover for the tablet computer further includes two magnetic elements. There is a magnetic attraction between the two magnetic elements. The two magnetic elements are disposed between the second supporting member and the tablet computer. The electrical block can move straight along the electrical guide rail. Under a premise that the tablet computer does not rotate, the tablet computer is fixed at different heights of the second supporting member through the two magnetic elements.

In an embodiment of the present invention, a number of the electrical blocks is plural. A number of the electrical guide rails is plural. The electrical guide rails extend parallel to each other. An arrangement direction of the electrical blocks is perpendicular to a parallel extending direction of the electrical guide rails.

In an embodiment of the present invention, the electrical guide rail includes a longitudinal section and a transverse section perpendicular to each other.

In the present invention, a computer signal transmission member is arranged on the tablet computer, and a protective cover signal transmission member is arranged on the protective cover. By the design in which one of the computer signal transmission member and the protective cover signal transmission member is an electrical block and the other is an electrical guide rail, the computer signal transmission member and the protective cover signal transmission member can always form an electrical connection regardless the tablet computer rotates at any angle, moves in height, moves laterally, or any other combination of components after moving.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
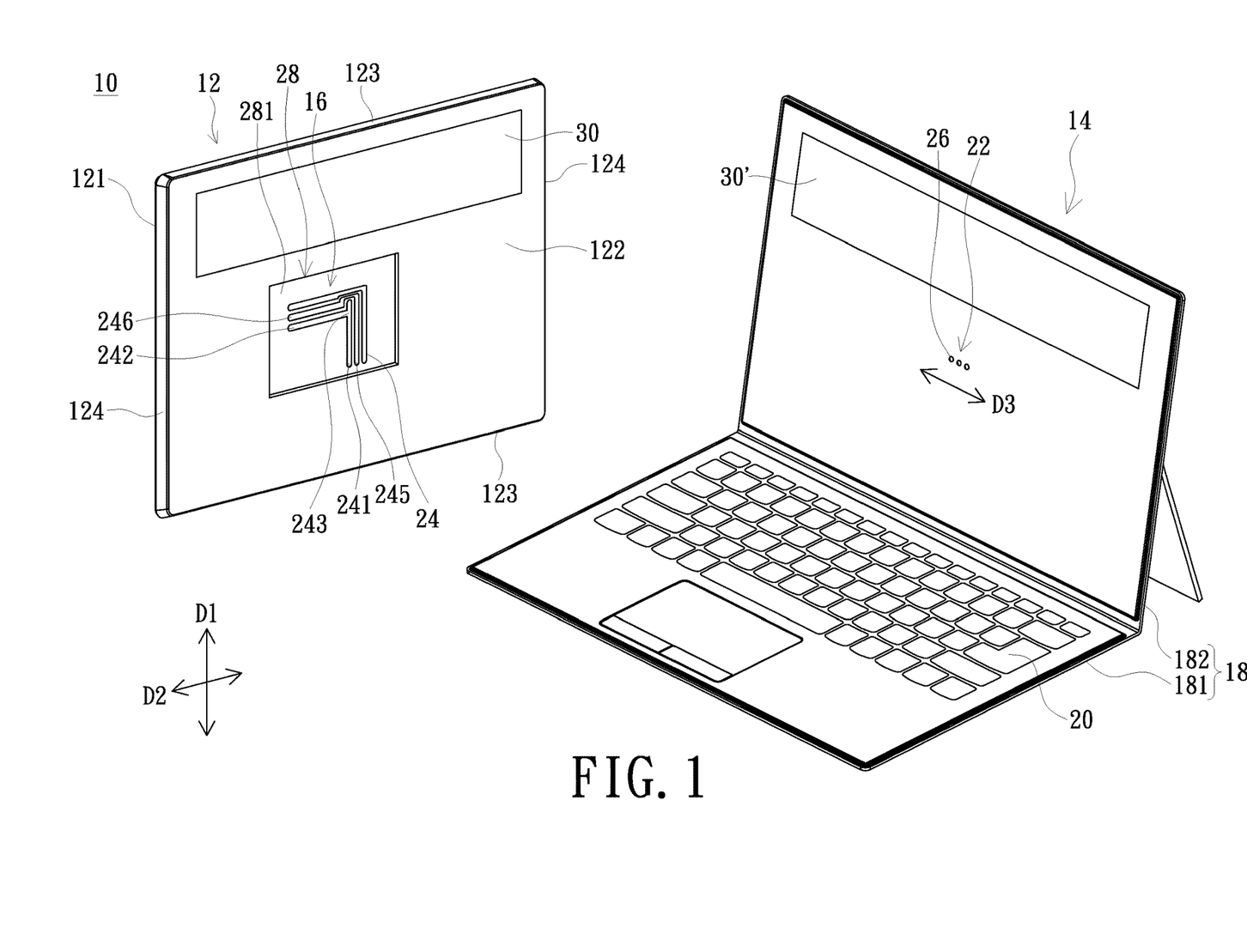
FIG. 1 is a schematic view of a portable electronic device in which a tablet computer and a protective cover are separated from each other according to a first embodiment of the present invention.

FIG. 1 is a schematic view of a portable electronic device in which a tablet computer and a protective cover are separated from each other according to a first embodiment of the present invention. As shown in FIG. 1, the portable electronic device 10 includes a tablet computer 12 and a protective cover 14. In one embodiment, the tablet computer 12 includes a display surface 121 and a back surface 122. The back surface 122 is provided with a computer signal transmission member 16. The periphery of the tablet computer 12 includes, for example, two long edges 123 opposite to each other and two short edges 124 opposite to each other. The protective cover 14 includes a main body 18, a peripheral device 20, and a protective cover signal transmission member 22. The main body 18 includes a first supporting member 181 and a second supporting member 182 connected to each other. The first supporting member 181 and the second supporting member 182 can be opened and closed relative to each other. In one embodiment, the peripheral device 20 is disposed on the first supporting member 181, the protective cover signal transmission member 22 is disposed on the second supporting member 182, and the protective cover signal transmission member 22 is electrically connected to the peripheral device 20. The second supporting member 182 can be used to support the tablet computer 12, and the protective cover signal transmission member 22 of the protective cover 14 can be docked with the computer signal transmission member 16 of the tablet computer 12, so that the protective cover 14 and the tablet computer 12 can transmit power and signals therebetween. In one embodiment as shown in FIG. 1, the computer signal transmission member 16 includes an electrical guide rail 24, and the protective cover signal transmission member 22 includes an electrical block 26, which is, for example, a pogo pin, but not limited thereto. Selectively, in a second embodiment shown in FIG. 5, the computer signal transmission member 16 may include an electrical block 26, and the protective cover signal transmission member 22 may include an electrical guide rail 24A. The number of electrical guide rails 24/24A can be one or plural, the number of electrical blocks 26 can also be one or plural, and the number of electrical guide rails 24/24A and the number of electrical blocks 26 can be the same or similar.

As shown in FIG. 1, the electrical guide rail 24 includes, for example, a longitudinal section 241, a transverse section 242, and a turning section 243. The longitudinal section 241 and the transverse section 242 may be perpendicular to each other. The longitudinal section 241 extends, for example, along the first direction D1. The transverse section 242 extends, for example, along the second direction D2. The turning section 243 is connected between the longitudinal section 241 and the transverse section 242. The first direction D1 is, for example, parallel to the short edge 124 of the tablet computer 12, and the second direction D2 is, for example, parallel to the long edge 123 of the tablet computer 12. The electrical guide rail 24 includes a first end 245 and a second end 246 opposite to each other. The first end 245 is, for example, the end of the longitudinal section 241 away from the turning section 243, and the second end 246 is, for example, the end of the transverse section 242 away from the turning section 243. In one embodiment when the number of electrical guide rails 24 is plural, the longitudinal sections 241 of the electrical guide rails 24 extend parallel to each other, and the transverse sections 242 extend parallel to each other.

Figure 2:
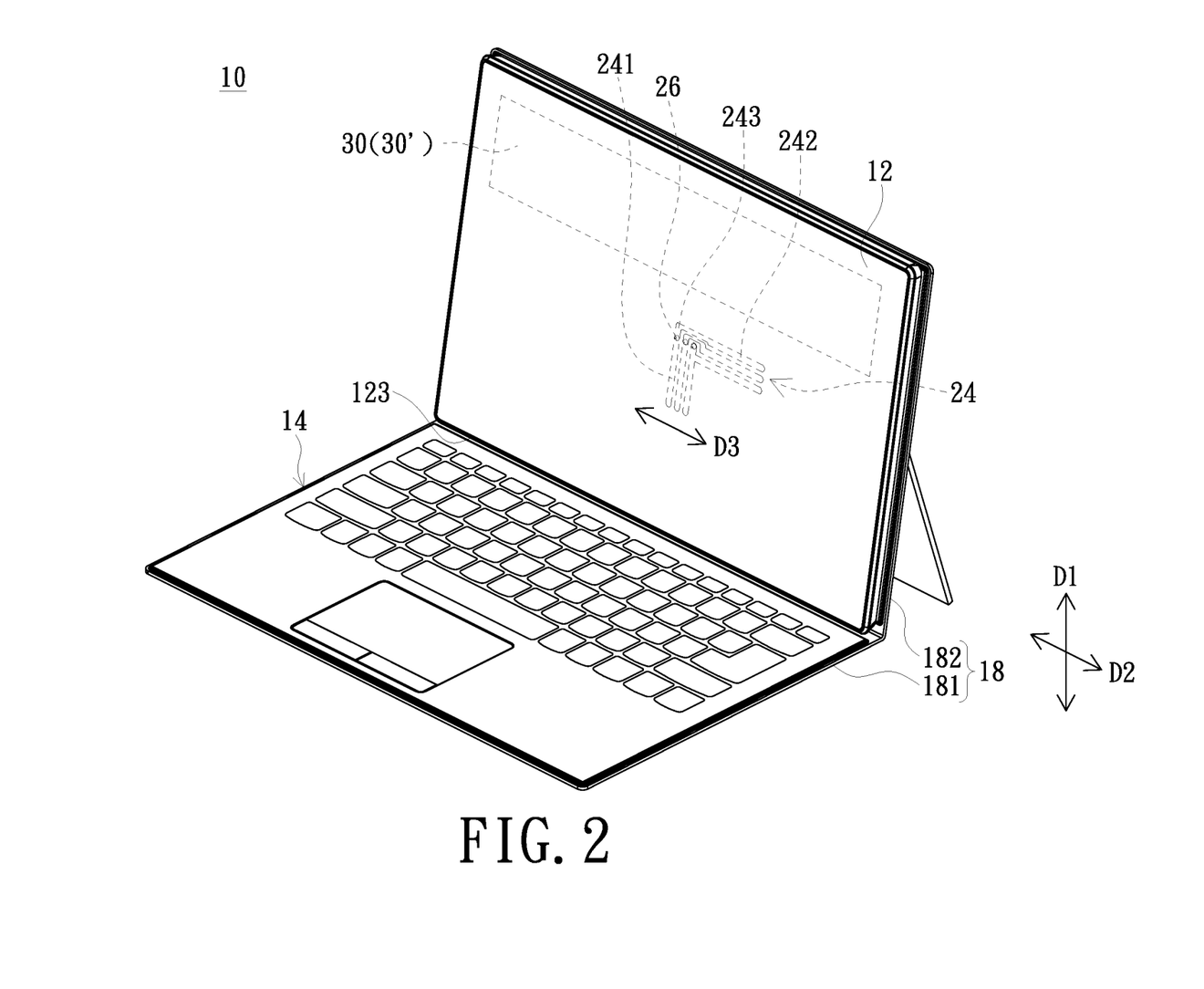
FIG. 2 is a schematic view of a portable electronic device in which the tablet computer is placed relative to the protective cover in a first placement scenario according to a first embodiment of the present invention.
Figure 3:
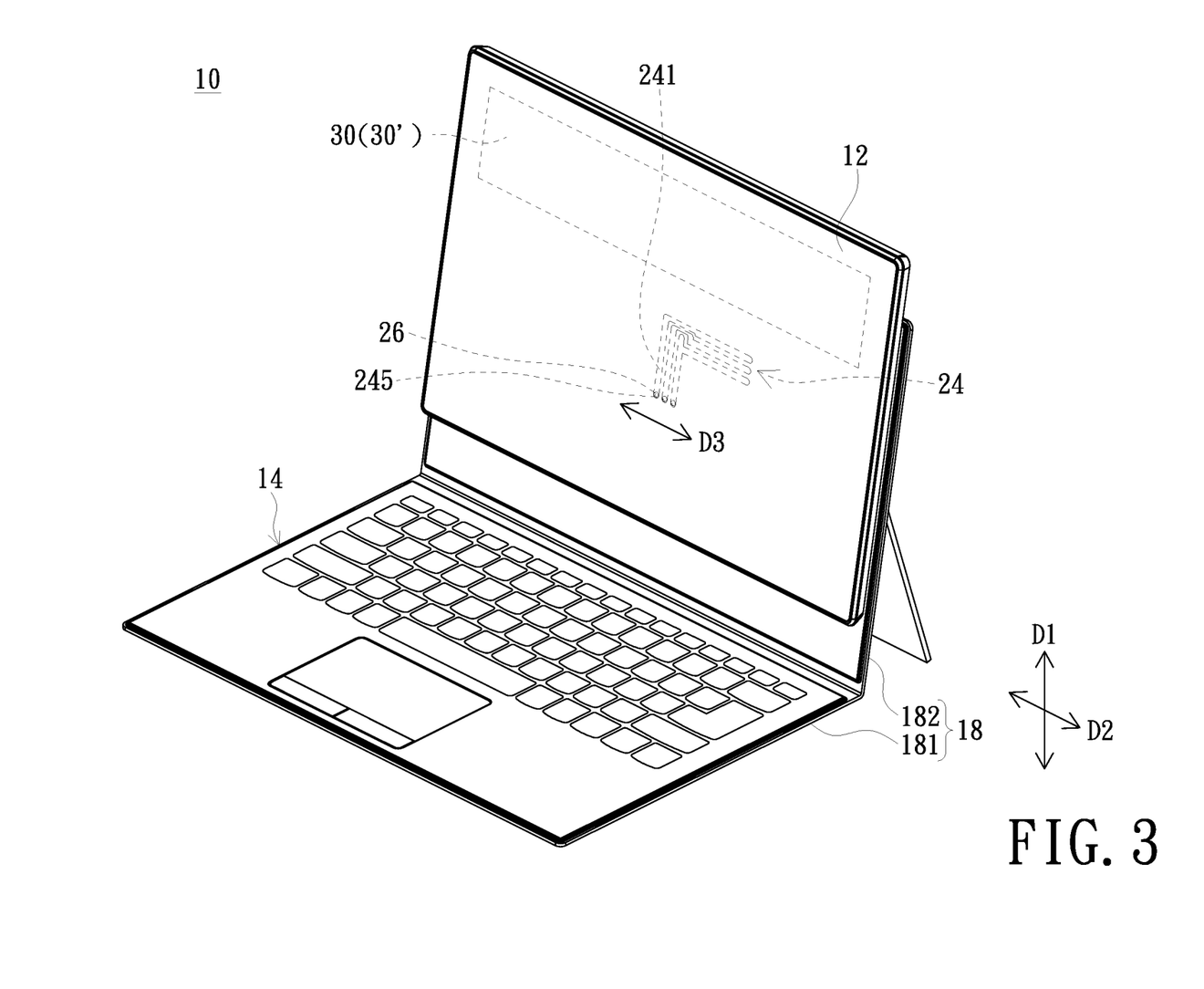
FIG. 3 is a schematic view of a portable electronic device in which the tablet computer is placed relative to the protective cover in a second placement scenario according to a first embodiment of the present invention.
Figure 4:
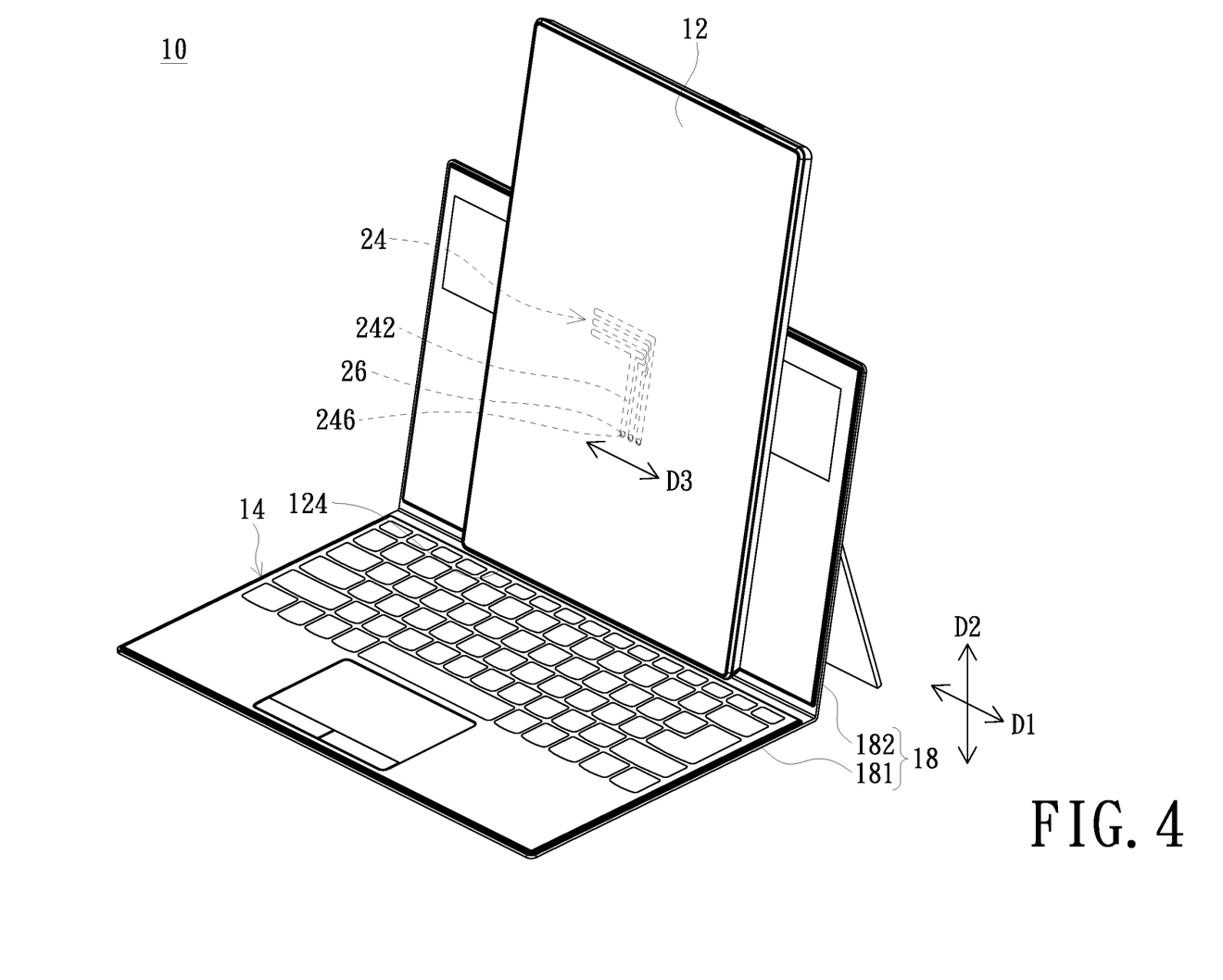
FIG. 4 is a schematic view of a portable electronic device in which the tablet computer is placed relative to the protective cover in a third placement scenario according to a first embodiment of the present invention.

The position of the electrical block 26 on the second supporting member 182 is such that the electrical guide rail 24 on the back surface 122 of the tablet computer 12 can touch and form an electrical connection with the electrical block 26 when the tablet computer 12 is supported on the second supporting member 182. FIG. 2 is a schematic view of a portable electronic device in which the tablet computer is placed relative to the protective cover in a first placement scenario according to a first embodiment of the present invention. FIG. 3 is a schematic view of a portable electronic device in which the tablet computer is placed relative to the protective cover in a second placement scenario according to a first embodiment of the present invention. FIG. 4 is a schematic view of a portable electronic device in which the tablet computer is placed relative to the protective cover in a third placement scenario according to a first embodiment of the present invention. As shown in FIG. 2, the tablet computer 12 is placed as a whole (normally standing horizontally) on the second supporting member 182 of the main body 18 of the protective cover 14, and one long edge 123 of the tablet computer 12 can abut against the junction of the first supporting member 181 and the second supporting member 182. In one embodiment, the electrical block 26 can be located at the longitudinal section 241 of the electrical guide rail 24 adjacent to the turning section 243 when the tablet computer 12 is placed relative to the main body 18 in the first placement situation as shown in FIG. 2, so that the tablet computer 12 and the protective cover 14 are electrically connected for power and signal transmission.

When the tablet computer 12 is raised to a specific height relative to the second supporting member 182 to present the second placement situation as shown in FIG. 3, the electrical block 26 can be located at the first end 245 of the longitudinal section 241 of the electrical guide rail 24, so that the tablet computer 12 and the protective cover 14 are electrically connected for power and signal transmission. When the tablet computer 12 rotates 90 degrees relative to the second supporting member 182 to present the third placement situation as shown in FIG. 4, one short edge 124 of the tablet computer 12 can abut against the junction of the first supporting member 181 and the second supporting member 182. The electrical block 26 can be located at the second end 246 of the transverse section 242 of the electrical guide rail 24, so that the tablet computer 12 and the protective cover 14 are electrically connected for power and signal transmission. The first, second, and third placement scenarios described above take the tablet computer 12 standing horizontally, raised up, and standing upright as an example for description, but the invention is not limited thereto. The electrical block 26 can all be electrically connected with the electrical guide rail 24 when the tablet computer 12 rotates at any angle, moves in height, moves laterally, or any other combination of components after moving.

In one embodiment, the peripheral device 20 is a keyboard, through which the user can input characters/numbers and other operations on the tablet computer 12. In an actual operation, the peripheral device 20 can also be other devices, such as a digital music device, a game operating device, etc., capable of inputting control instructions to the tablet computer 12, and the invention is not limited thereto.

In the above embodiment, the protective cover 14 includes the main body 18, the peripheral device 20 and the protective cover signal transmission member 22. In another embodiment not shown, the protective cover 14 may only include the main body 18 and the protective cover signal transmission member 22. When using the protective cover 14, the user can assemble and configure a peripheral device (such as a keyboard, etc.) on the second supporting member 182 of the main body 18 according to actual needs. At this time, the peripheral device 20 and the protective cover signal transmission member 22 can realize electrical connection.

In one embodiment as shown in FIG. 1, when the number of the electrical blocks 26 is plural, the arrangement direction D3 of the electrical blocks 26 is perpendicular to the parallel extension direction of the electrical guide rail 24. Specifically, as shown in FIGS. 2 and 3, the arrangement direction D3 of the electrical blocks 26 is, for example, perpendicular to the parallel extension direction (i.e., the first direction D1) of the longitudinal section 241 of the electrical guide rail 24. As shown in FIG. 4, when the tablet computer 12 rotates 90 degrees, the arrangement direction D3 of the electrical blocks 26 is, for example, perpendicular to the parallel extension direction (i.e., the second direction D2) of the transverse section 242 of the electrical guide rail 24. In this way, an electrical connection with the electrical blocks 26 of the protective cover 14 is maintained no matter whether the tablet computer 12 is installed horizontally or vertically, thereby maintaining the transmission of power and signals.

Please continue to refer to FIG. 1. In one embodiment, a groove 28 may be provided on the back surface 122 of the tablet computer 12 when the computer signal transmission member 16 of the tablet computer 12 includes an electrical guide rail 24 and the protective cover signal transmission member 22 of the protective cover 14 includes an electrical block 26. The groove 28 has a top opening (not labeled) and a bottom 281, and the electrical guide rail 24 is disposed on the bottom 281.

As shown in FIG. 1, the portable electronic device 10 further includes two magnetic elements 30, 30', and there is a magnetic attraction between the two magnetic elements 30, 30'. In one embodiment, the two magnetic elements 30, 30' are respectively disposed on the back surface 122 of the tablet computer 12 and the side of the second supporting member 182 of the protective cover 14 facing the peripheral device 20. When the tablet computer 12 is supported by the second supporting member 182 as shown in FIGS. 2 and 3, the two magnetic elements 30, 30' are disposed between the second supporting member 182 and the tablet computer 12, and the electrical block 26 can move straight along the electrical guide rail 24. Under the premise that the tablet computer 12 does not rotate, the tablet computer 12 is fixed at different heights of the second supporting member 182 through the two magnetic elements 30, 30'.

Figure 5:
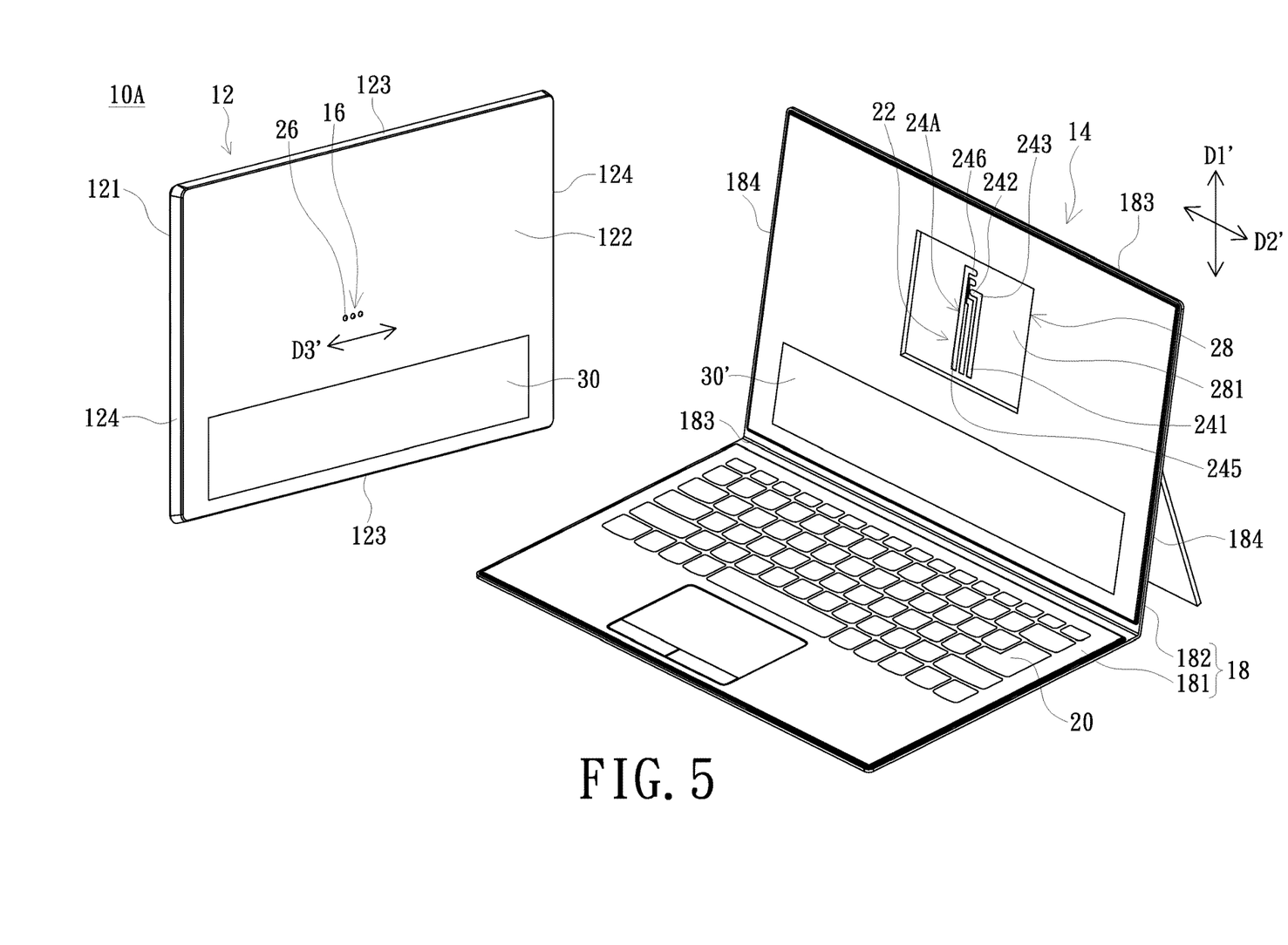
FIG. 5 is a schematic view of a portable electronic device in which a tablet computer and a protective cover are separated from each other according to a second embodiment of the present invention.

FIG. 5 is a schematic view of a portable electronic device in which a tablet computer and a protective cover are separated from each other according to a second embodiment of the present invention. As shown in FIG. 5, the difference between the portable electronic device 10A of the second embodiment and the portable electronic device 10 of the first embodiment is: the computer signal transmission member 16 provided on the back surface 122 of the tablet computer 12 of the portable electronic device 10A includes an electrical block 26, and the protective cover signal transmission member 22 provided on the second supporting member 182 of the protective cover 14 includes an electrical guide rail 24A. In one embodiment, the periphery of the second supporting member 182 includes, for example, two long edges 183 opposite to each other and two short edges 184 opposite to each other. The second supporting member 182 is, for example, connected with the first supporting member 181 by one long edge 183 thereof. As shown in FIG. 5, although the shape and configuration of the electrical guide rail 24A are different from the electrical guide rail 24 shown in the first embodiment, the electrical guide rail 24A essentially still includes a longitudinal section 241, a transverse section 242, and a turning section 243. The longitudinal section 241 and the transverse section 242 may be perpendicular to each other. The longitudinal section 241 extends, for example, along the first direction D1'. The transverse section 242 extends, for example, along the second direction D2'. The turning section 243 is connected between the longitudinal section 241 and the transverse section 242. The first direction D1' is, for example, parallel to the short edge 184 of the second supporting member 182, and the second direction D2' is, for example, parallel to the long edge 183 of the second supporting member 182. The electrical guide rail 24A includes a first end 245 and a second end 246 opposite to each other. The first end 245 is, for example, the end of the longitudinal section 241 away from the turning section 243, and the second end 246 is, for example, the end of the transverse section 242 away from the turning section 243. In one embodiment when the number of electrical guide rails 24A is plural, the longitudinal sections 241 of the electrical guide rails 24A extend parallel to each other, and the transverse sections 242 extend parallel to each other.

Figure 6:
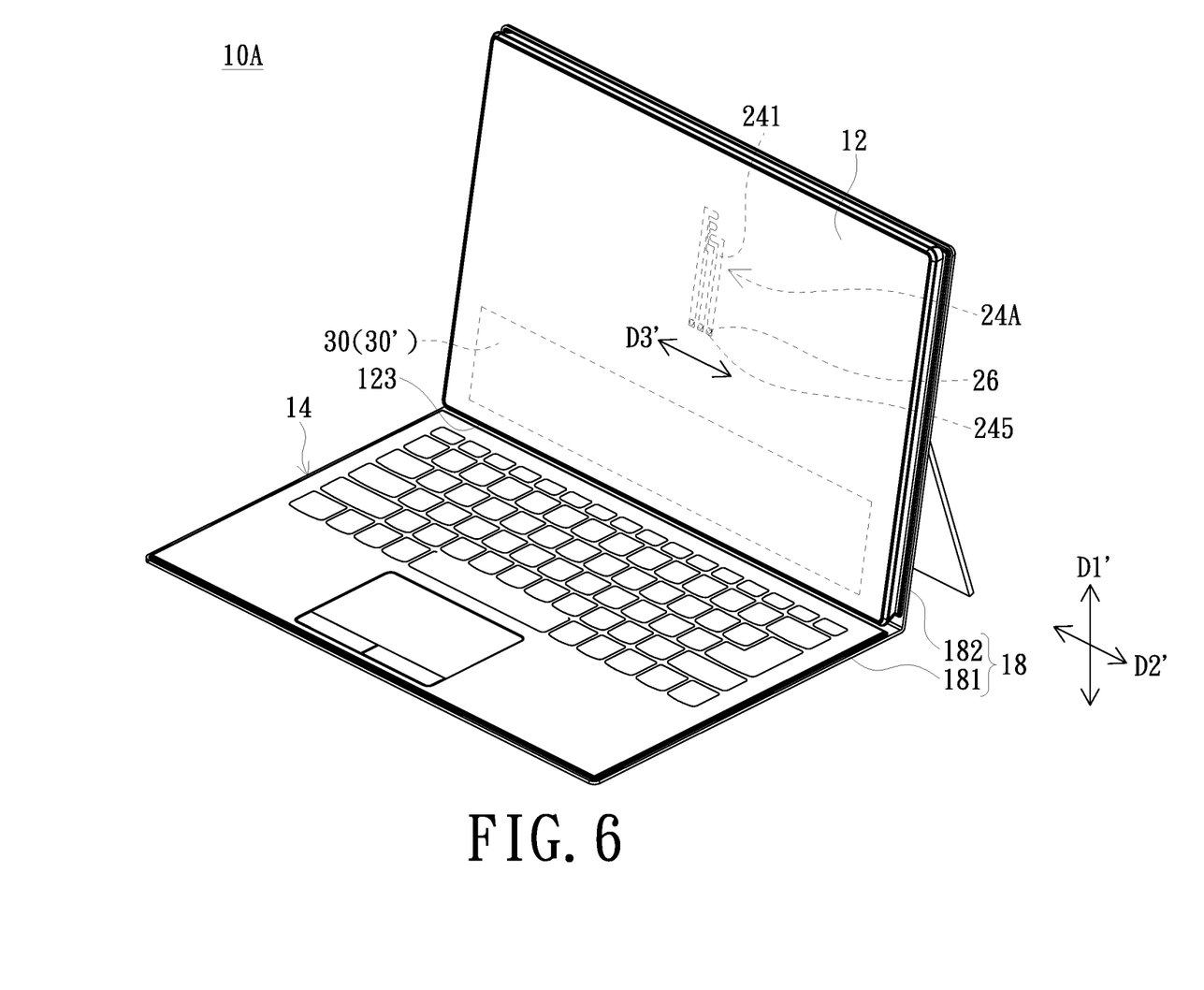
FIG. 6 is a schematic view of a portable electronic device in which the tablet computer is placed relative to the protective cover in a first placement scenario according to a second embodiment of the present invention.
Figure 7:
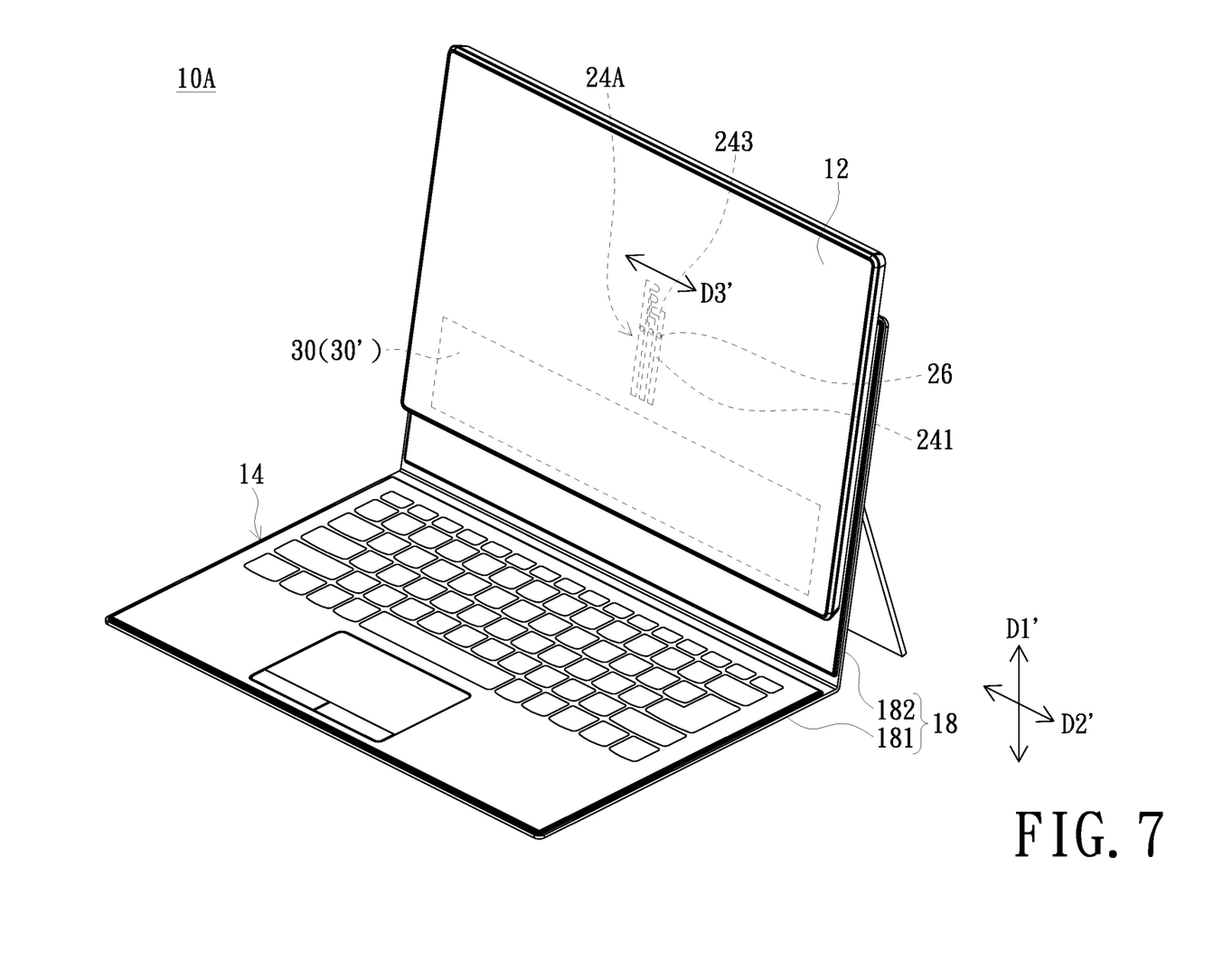
FIG. 7 is a schematic view of a portable electronic device in which the tablet computer is placed relative to the protective cover in a second placement scenario according to a second embodiment of the present invention.
Figure 8:
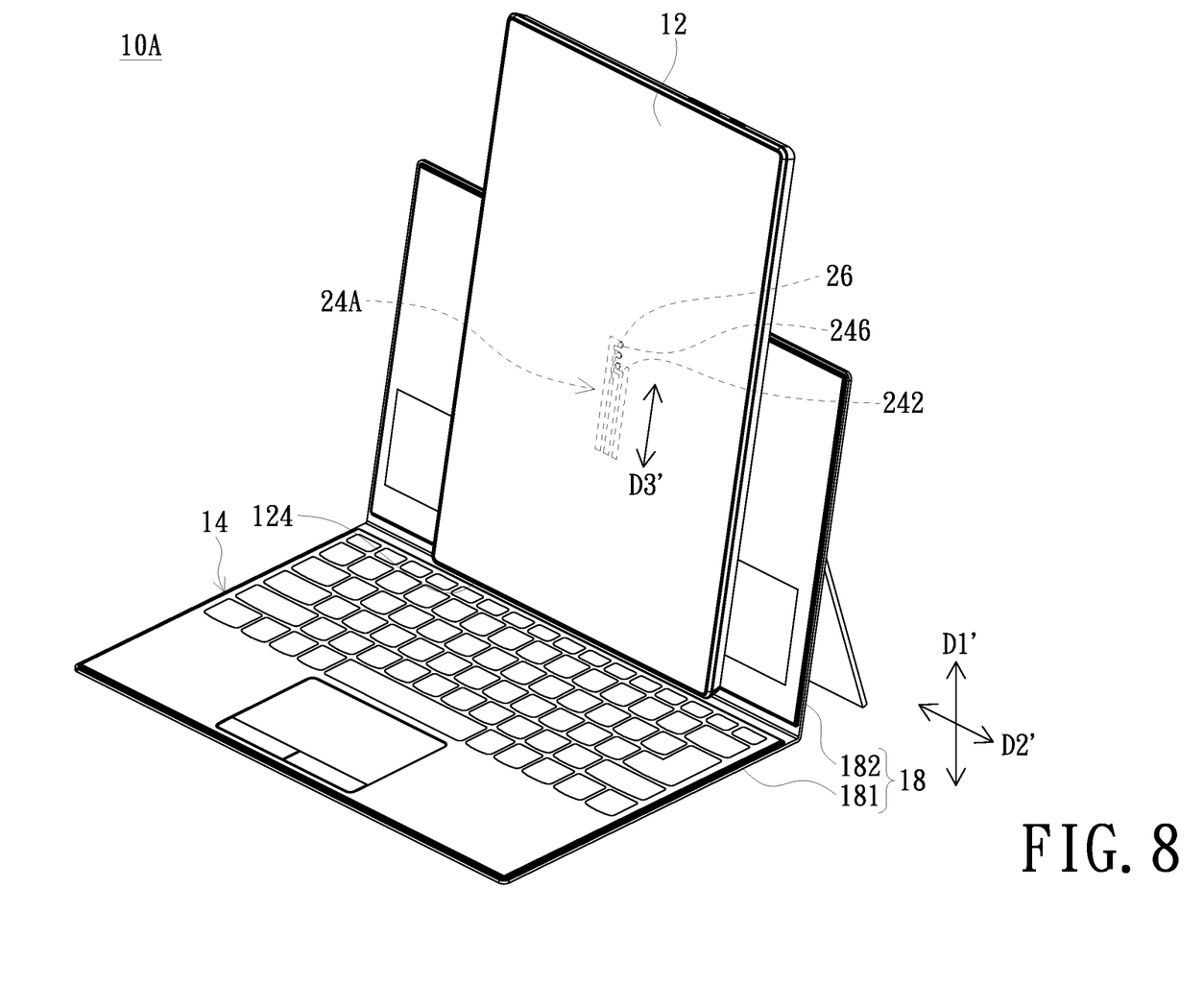
FIG. 8 is a schematic view of a portable electronic device in which the tablet computer is placed relative to the protective cover in a third placement scenario according to a second embodiment of the present invention.

FIG. 6 is a schematic view of a portable electronic device in which the tablet computer is placed relative to the protective cover in a first placement scenario according to a second embodiment of the present invention. FIG. 7 is a schematic view of a portable electronic device in which the tablet computer is placed relative to the protective cover in a second placement scenario according to a second embodiment of the present invention. FIG. 8 is a schematic view of a portable electronic device in which the tablet computer is placed relative to the protective cover in a third placement scenario according to a second embodiment of the present invention. As shown in FIG. 6, when the tablet computer 12 is placed relative to the main body 18 to present the first placement scenario the tablet computer 12 is placed as a whole (normally standing horizontally) on the second supporting member 182 of the main body 18 of the protective cover 14, and one long edge 123 of the tablet computer 12 can abut against the junction of the first supporting member 181 and the second supporting member 182. In one embodiment, the electrical block 26 can be located at the first end 245 of the longitudinal section 241 of the electrical guide rail 24A, so that the tablet computer 12 and the protective cover 14 are electrically connected for power and signal transmission.

When the tablet computer 12 is raised to a specific height relative to the second supporting member 182 to present the second placement situation as shown in FIG. 7, the electrical block 26 can be located at the longitudinal section 241 of the electrical guide rail 24A adjacent to the turning section 243, so that the tablet computer 12 and the protective cover 14 are electrically connected for power and signal transmission. When the tablet computer 12 rotates 90 degrees relative to the second supporting member 182 to present the third placement situation as shown in FIG. 8, one short edge 124 of the tablet computer 12 can abut against the junction of the first supporting member 181 and the second supporting member 182. The electrical block 26 can be located at the second end 246 of the transverse section 242 of the electrical guide rail 24A, so that the tablet computer 12 and the protective cover 14 are electrically connected for power and signal transmission.

The first, second, and third placement scenarios of the portable electronic device in the second embodiment take the tablet computer 12 standing horizontally, raised up, and standing upright as an example for description, but the invention is not limited thereto. The electrical block 26 can all be electrically connected with the electrical guide rail 24A when the tablet computer 12 rotates at any angle, moves in height, moves laterally, or any other combination of components after moving.

In one embodiment as shown in FIG. 5, when the number of the electrical blocks 26 provided on the back surface 122 of the tablet computer 12 is plural, the arrangement direction D3' of the electrical blocks 26 is perpendicular to the parallel extension direction of the electrical guide rail 24A. Specifically, as shown in FIGS. 6 and 7, the arrangement direction D3' of the electrical blocks 26 is, for example, perpendicular to the parallel extension direction (i.e., the first direction D1') of the longitudinal section 241 of the electrical guide rail 24A. As shown in FIG. 8, when the tablet computer 12 rotates 90 degrees, the arrangement direction D3' of the electrical blocks 26 is, for example, perpendicular to the parallel extension direction (i.e., the second direction D2') of the transverse section 242 of the electrical guide rail 24A. In this way, an electrical connection with the electrical guide rail 24A of the protective cover 14 is maintained no matter whether the tablet computer 12 is installed horizontally or vertically, thereby maintaining the transmission of power and signals.

Corresponding to the first embodiment, a groove 28 may be provided on the second supporting member 182 of the main body 18 of the protective cover 14 as shown in FIG. 5 when the computer signal transmission member 16 of the tablet computer 12 includes an electrical block 26 and the protective cover signal transmission member 22 of the protective cover 14 includes an electrical guide rail 24A. The groove 28 has a top opening (not labeled) and a bottom 281, and the electrical guide rail 24A is disposed on the bottom 281. In an embodiment not shown, the electrical guide rail 24A can be further disposed in the protective cover 14 and is covered by the skin of the protective cover 14 without being exposed to the outside.

Corresponding to the first embodiment, the portable electronic device 10 further includes two magnetic elements 30, 30' respectively disposed on the side of the second supporting member 182 of the protective cover 14 facing the peripheral device 20 and the back surface 122 of the tablet computer 12, and there is a magnetic attraction between the two magnetic elements 30, 30'. When the tablet computer 12 is supported by the second supporting member 182 as shown in FIGS. 6 and 7, the two magnetic elements 30, 30' are disposed between the second supporting member 182 and the tablet computer 12, and the electrical block 26 can move straight along the electrical guide rail 24A. Under the premise that the tablet computer 12 does not rotate, the tablet computer 12 is fixed at different heights of the second supporting member 182 through the two magnetic elements 30, 30'.

According to the above, in the portable electronic device of the embodiment of the present invention, by the arrangement of the computer signal transmission member of the tablet computer and the protective cover signal transmission member of the protective cover, the computer signal transmission member and the protective cover signal transmission member can always form an electrical connection regardless the tablet computer rotates at any angle, moves in height, moves laterally, or any other combination of components after moving. In this way, it is convenient for the user to input instructions by operating the peripheral devices, which not only reduces the cost, but also has the advantage of high operation smoothness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A protective cover for removably coupling at least three electrical blocks arranged in a straight line, the protective cover comprising:

a main body, comprising a first supporting member and a second supporting member connected to each other, the first supporting member and the second supporting member being able to be opened and closed relative to each other;

two outer electrical guide rails and at least one inner electrical guide rail respectively attachably corresponding to the electrical blocks, the outer electrical guide rails and the inner electrical guide rail at least partially arranged on the second supporting member in parallel, each of the outer electrical guide rails and the inner electrical guide rail having a longitudinal section and a transverse section connected to each other, wherein the longitudinal section extends by a first length parallel to a first direction, the transverse section extends by a second length parallel to a second direction, and the first direction crosses the second direction, wherein when the electrical blocks correspondingly couple the longitudinal sections of the outer electrical guide rails and the inner electrical guide rail, the electrical blocks are able to move along the outer electrical guide rails and the inner electrical guide rail to be aligned with the transverse section of the inner electrical guide rail in a line along the second length in the second direction; or wherein when the electrical blocks correspondingly couple the traverse sections of the outer electrical guide rails and the inner electrical guide rail, the electrical blocks are able to move along the outer electrical guide rails and the inner electrical guide rail to be aligned with the longitudinal section of the inner electrical guide rail in a line along the first length in the first direction.

2. The protective cover according to claim 1, wherein each of the outer electrical guide rails and the at least one inner electrical guide rail further has a turning section connected between the longitudinal section and the transverse section.

3. The protective cover according to claim 1, wherein the electrical block is a pogo pin.

4. The protective cover according to claim 1, further comprising a magnetic element disposed on the second supporting member.

5. The protective cover according to claim 1, wherein the longitudinal section and the traverse section of each of the outer electrical guide rails and the inner electrical guide rail are perpendicular to each other.

6. The protective cover according to claim 1, further comprising a peripheral device disposed on the first supporting member.

7. The protective cover according to claim 1, wherein the longitudinal section of one of the two outer electrical guide rails extends upward beyond the traverse section.

8. The protective cover according to claim 1, wherein the longitudinal section of the inner electrical guide rail extends upward beyond the traverse section.

9. The protective cover according to claim 1, wherein the traverse sections of the two outer electrical guide rails extend toward opposite directions.

10. The protective cover according to claim 1, wherein when the electrical blocks couple the outer electrical guide rails and the inner electrical guide rail, the electrical blocks are arranged perpendicular to the longitudinal section or the traverse section.

* * * * *